US008556703B2

(12) United States Patent
Bramble

(10) Patent No.: US 8,556,703 B2
(45) Date of Patent: Oct. 15, 2013

(54) METHOD OF GAMING, A GAME CONTROLLER AND A GAMING SYSTEM

(75) Inventor: Paul Francis Jason Bramble, Artarmon (AU)

(73) Assignee: Aristocrat Technologies Australia Pty Limited (AU)

( * ) Notice: Subject to any disclaimer, the term of this patent is extended or adjusted under 35 U.S.C. 154(b) by 713 days.

(21) Appl. No.: 12/340,194

(22) Filed: Dec. 19, 2008

(65) Prior Publication Data

US 2009/0239662 A1 Sep. 24, 2009

(30) Foreign Application Priority Data

Dec. 20, 2007 (AU) ................................ 2007907032

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC ............................................... 463/21; 463/23

(58) Field of Classification Search
USPC ...................................................... 463/21, 23
See application file for complete search history.

(56) References Cited

U.S. PATENT DOCUMENTS

| | | | | |
|---|---|---|---|---|
| 5,401,023 | A * | 3/1995 | Wood | 463/13 |
| 6,068,552 | A * | 5/2000 | Walker et al. | 463/21 |
| 6,537,150 | B1 | 3/2003 | Luciano et al. | |
| 7,740,533 | B2 * | 6/2010 | Walker et al. | 463/13 |
| 2003/0078101 | A1 * | 4/2003 | Schneider et al. | 463/42 |
| 2004/0048644 | A1 | 3/2004 | Gerrard et al. | |
| 2006/0258434 | A1 | 11/2006 | Jaffe et al. | |
| 2007/0218972 | A1 | 9/2007 | Gerson et al. | |
| 2008/0039171 | A1 * | 2/2008 | Slomiany et al. | 463/16 |
| 2009/0305776 | A1 * | 12/2009 | Englman et al. | 463/25 |
| 2010/0016071 | A1 * | 1/2010 | Jaffe et al. | 463/27 |

FOREIGN PATENT DOCUMENTS

JP 2004049458 2/2004

* cited by examiner

*Primary Examiner* — Fernando L Toledo
*Assistant Examiner* — Karen Kusumakar
(74) *Attorney, Agent, or Firm* — McAndrews, Held & Malloy, Ltd.

(57) ABSTRACT

A method of gaming comprising: conducting a game requiring a player to make a choice between at least one optimal action and at least one sub-optimal action having a lower return to player than the optimal action such that the difference between the sub-optimal action and the optimal action represents a lost return to player; receiving a player choice of an action; and conducting a trial for an award in which the probability of success is controlled to provide an expected return to player from the trial that compensates the player for the lost return to player in response to determining that the choice is a sub-optimal action.

23 Claims, 6 Drawing Sheets

METHOD OF GAMING, A GAME CONTROLLER AND A GAMING SYSTEM

RELATED APPLICATIONS

This application claims priority to Australian Provisional Patent Application No. 2007907032, having a filing date of Dec. 20, 2007, which is incorporated herein by reference in its entirety.

FEDERALLY SPONSORED RESEARCH OR DEVELOPMENT

Not Applicable

MICROFICHE/COPYRIGHT REFERENCE

Not Applicable

FIELD OF THE INVENTION

The present invention relates to a method of gaming, a game controller and a gaming system.

BACKGROUND OF THE INVENTION

Gaming systems which implement games that include an element of skill are known to provide players with enjoyment. However, a problem with such gaming systems is that if players exercise sub-optimal skill, the overall return to player can be less than intended. Further, the return to skilled players will be more than to less skilled players. Accordingly, it is sometimes a requirement to provide optimal play instructions to direct players how to obtain an optimal outcome. While this allows the same return to be made to all players, it lessens the enjoyment of those players who derive enjoyment by learning to exercise optimal skill.

Accordingly, a need exists for an alternative gaming system.

BRIEF SUMMARY OF THE INVENTION

In a first aspect, the invention provides a method of gaming comprising:

conducting a game requiring a player to make a choice between at least one optimal action and at least one sub-optimal action having a lower return to player than the optimal action such that the difference between the sub-optimal action and the optimal action represents a lost return to player;

receiving a player choice of an action; and conducting a trial for an award in which the probability of success is controlled to provide an expected return to player from the trial that compensates the player for the lost return to player in response to determining that the choice is a sub-optimal action.

In an embodiment, the expected return to player is equivalent to the lost return to player and the trial is only conducted when the choice is a sub-optimal action.

In an embodiment, the method comprises conducting a normal trial for the award in response to a player choosing an optimal action such that a trial is conducted irrespective of the action and the expected return to player is increased when the choice is a sub-optimal action.

In an embodiment, the award is a progressive jackpot.

In an embodiment, the method comprises adding the lost return to player to a pool of the progressive jackpot.

In an embodiment, the choice is made as part of a game round and any trial is conducted prior to any further game round.

In a second aspect, the invention provides a game controller for a gaming system, the game controller arranged to:

conduct a game requiring a player to make a choice between at least one optimal action and at least one sub-optimal action having a lower return to player than the optimal action such that the difference between the sub-optimal action and the optimal action represents a lost return to player;

receive a player choice of an action; and conduct a trial for an award in which the probability of success is controlled to provide an expected return to player from the trial that compensates the player for the lost return to player in response to determining that the choice is a sub-optimal action.

In an embodiment, the expected return to player is equivalent to the lost return to player and the trial is only conducted when the choice is a sub-optimal action.

In an embodiment, the game controller is arranged to conduct a normal trial for the award in response to a player choosing an optimal action such that a trial is conducted irrespective of the action and the expected return to player is increased when the choice is a sub-optimal action.

In an embodiment, the award is a progressive jackpot and the game controller comprises a jackpot odds adjuster arranged to adjust the probability of success at the jackpot based on the player choice.

In an embodiment, the game controller is arranged to add the lost return to player to a pool of the progressive jackpot.

In an embodiment, the game controller is arranged such that the choice is made as part of a game round and any trial is conducted prior to any further game round.

In a third aspect, the invention provides a gaming system comprising:

a player interface comprising a display and an instruction input mechanism; and a game controller arranged to:

conduct a game requiring a player to make a choice between at least one optimal action and at least one sub-optimal action displayed to the player on the display, the sub-optimal action having a lower return to player than the optimal action such that the difference between the sub-optimal action and the optimal action represents a lost return to player, and receive a player choice of an action from the input mechanism, the gaming system further arranged to conduct a trial for an award in which the probability of success is controlled to provide an expected return to player from the trial that compensates the player for the lost return to player in response to determining that the choice is a sub-optimal action.

In an embodiment, the expected return to player is equivalent to the lost return to player and the trial is only conducted when the choice is a sub-optimal action.

In an embodiment, the gaming system is arranged to conducting a normal trial for the award in response to a player choosing an optimal action such that a trial is conducted irrespective of the action and the expected return to player is increased when the choice is a sub-optimal action.

In an embodiment, the award is a progressive jackpot and the gaming system comprises a jackpot odds adjuster arranged to adjust the probability of success at the jackpot based on the player choice.

In an embodiment, the gaming system is arranged to add the lost return to player to a pool of the progressive jackpot.

In an embodiment, the gaming system is arranged such that the choice is made as part of a game round and any trial is conducted prior to any further game round.

In an embodiment, the game controller is arranged to conduct the trial.

In an embodiment, the gaming system comprises a jackpot controller in data communication with the game controller and arranged to conduct the trial.

In a fourth aspect, the invention provides computer program code which when executed implements the above method.

In a fifth aspect, the invention provides a computer readable medium comprising the above program code.

In a sixth aspect, the invention provides a data signal comprising the above program code.

In a seventh aspect, the invention extends to transmitting the above program code.

BRIEF DESCRIPTION OF SEVERAL VIEWS OF THE DRAWINGS

An exemplary embodiment of the invention will now be described with reference to the accompanying drawings in which.

DETAILED DESCRIPTION OF THE INVENTION

Figure 1:
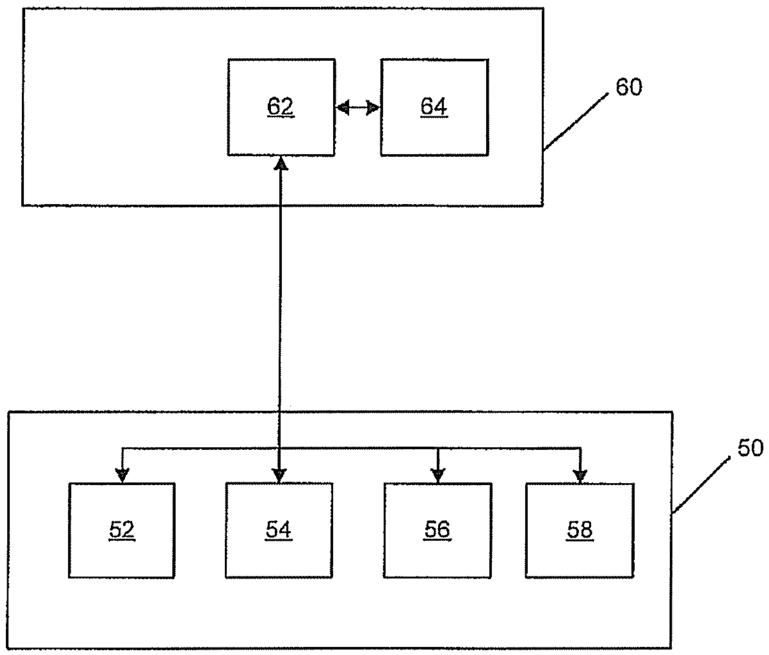
FIG. 1 is a block diagram of the core components of a gaming system.

Referring to the drawings, there is shown a gaming system having a game controller arranged to implement a game where players can seek to exercise skill to take optimal actions but if they take sub-optimal actions they are compensated by a chance or an increased chance to win an award. In an embodiment, all of the player return lost by sub-optimal choices is added to a jackpot pool and the players chances of winning a jackpot from the jackpot pool are adjusted to provide an expected player return equivalent to the lost return such that the player return is the same irrespective of a player's choices.

General Construction of Gaming System

The gaming system can take a number of different forms. In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system comprises several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions and play the game.

Components of the player interface may vary from embodiment to embodiment but will typically include a credit mechanism 52 to enable a player to input credits and receive payouts, one or more displays 54, a game play mechanism 56 that enables a player to input game play instructions (e.g. to place bets), and one or more speakers 58.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
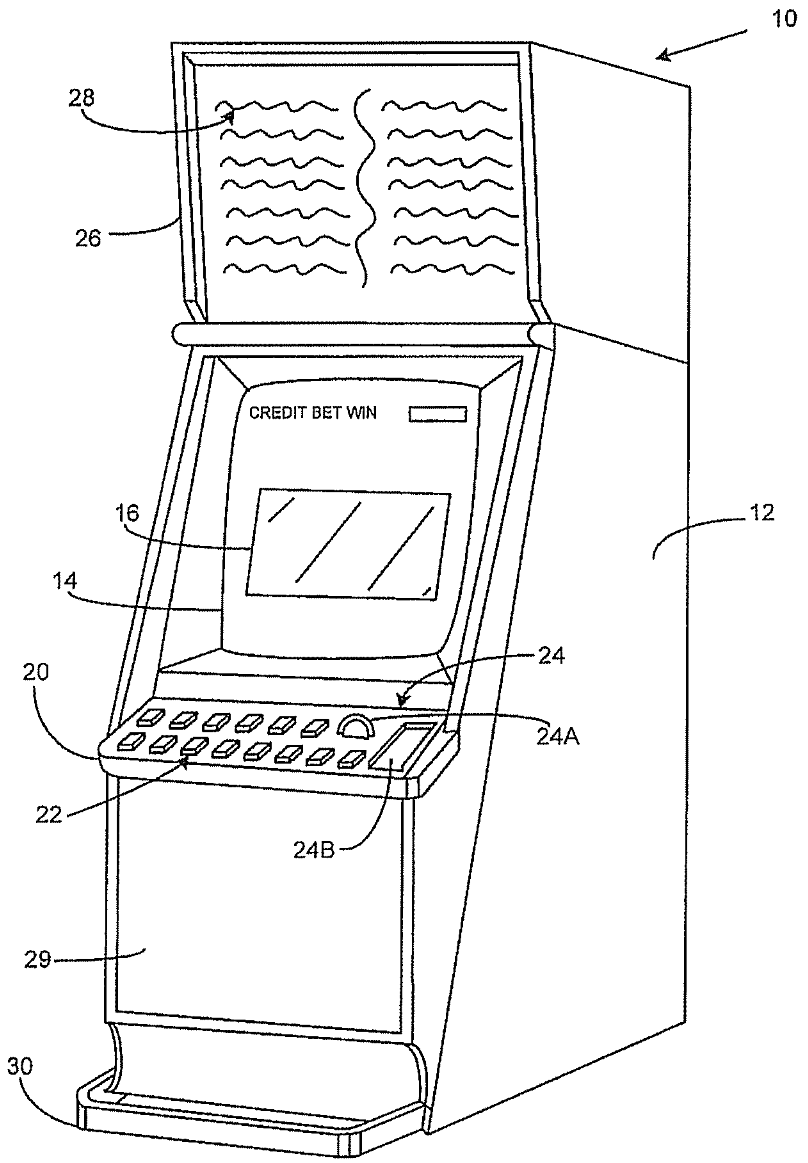
FIG. 2 is a perspective view of a stand alone gaming machine.

A gaming system in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module (not shown) having a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
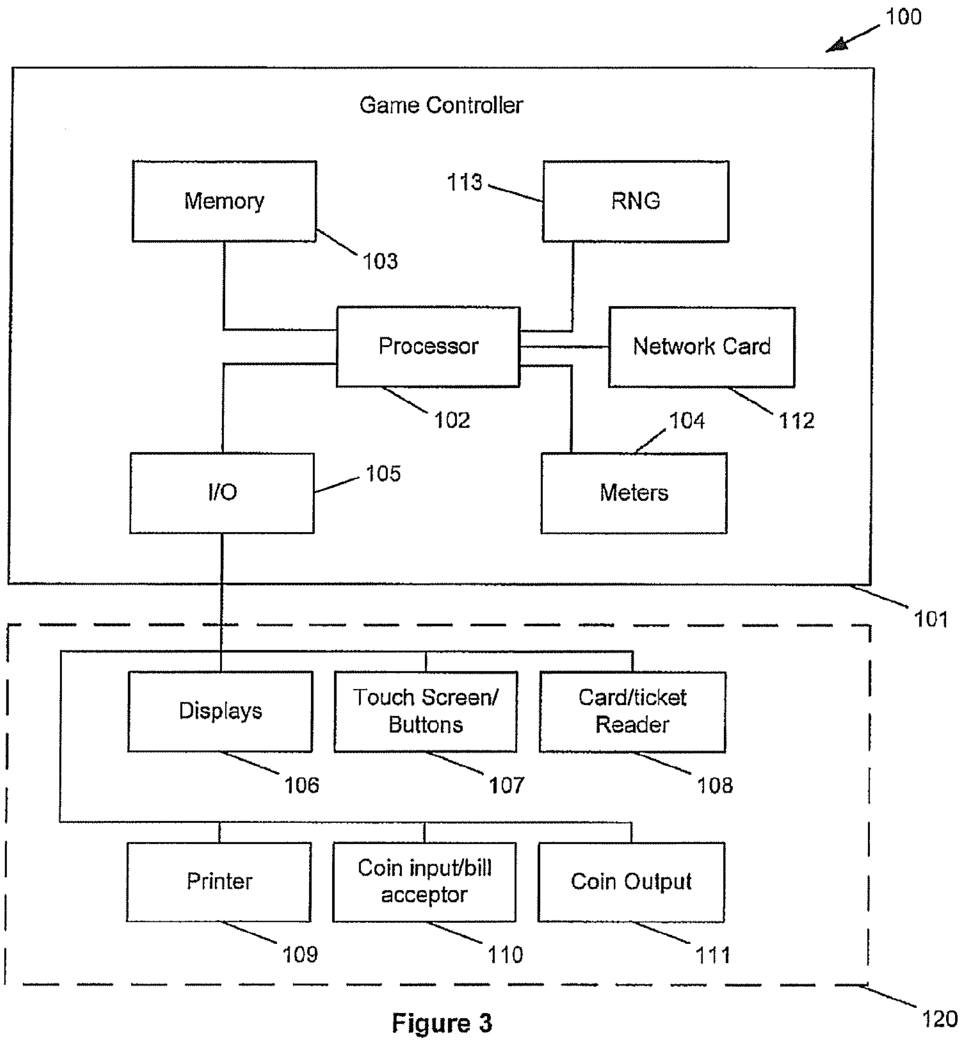
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 comprise one or more displays 106, a touch screen and/or buttons 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
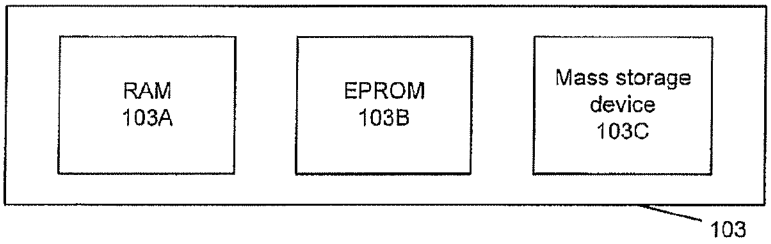
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
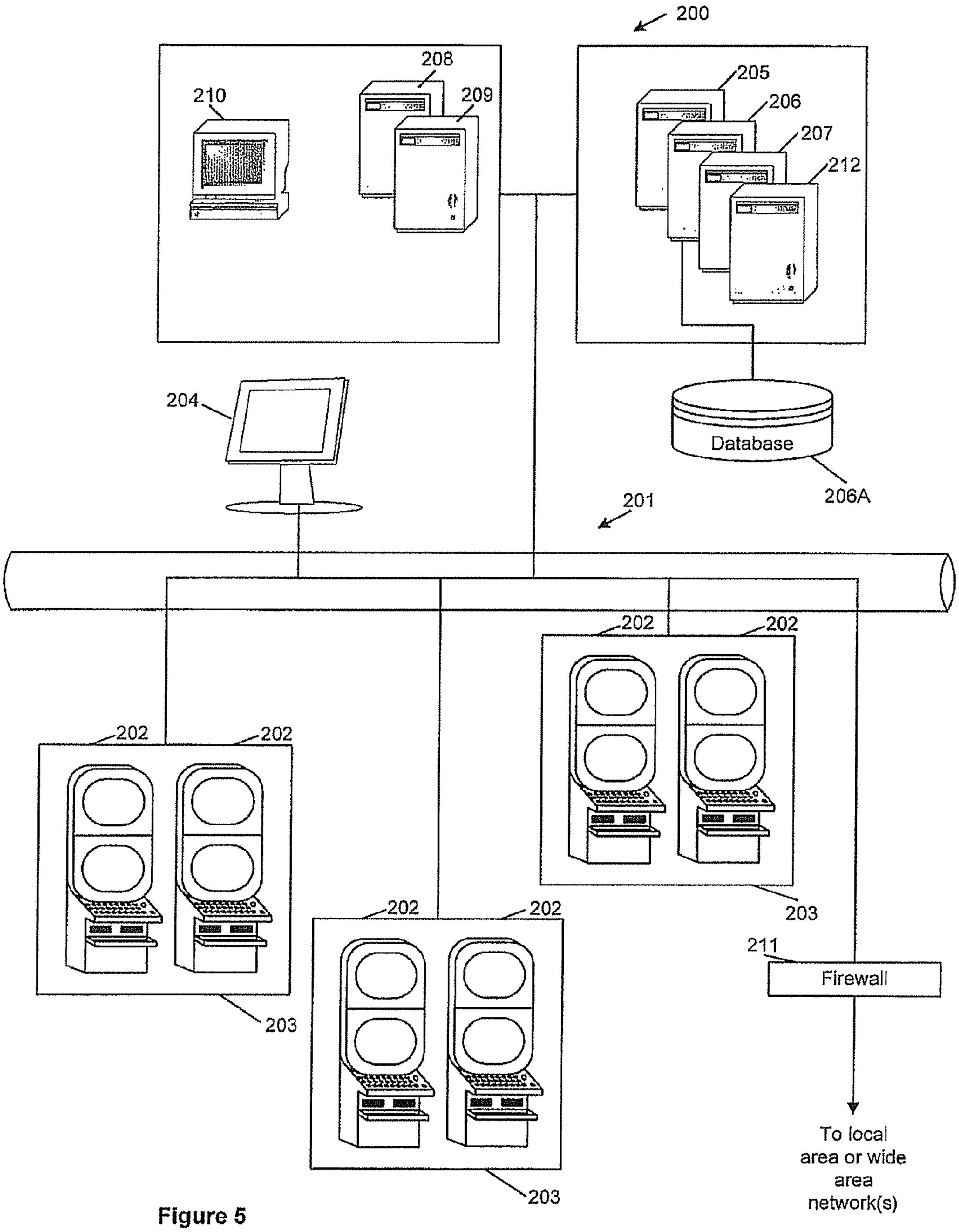
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming System

Figure 6:
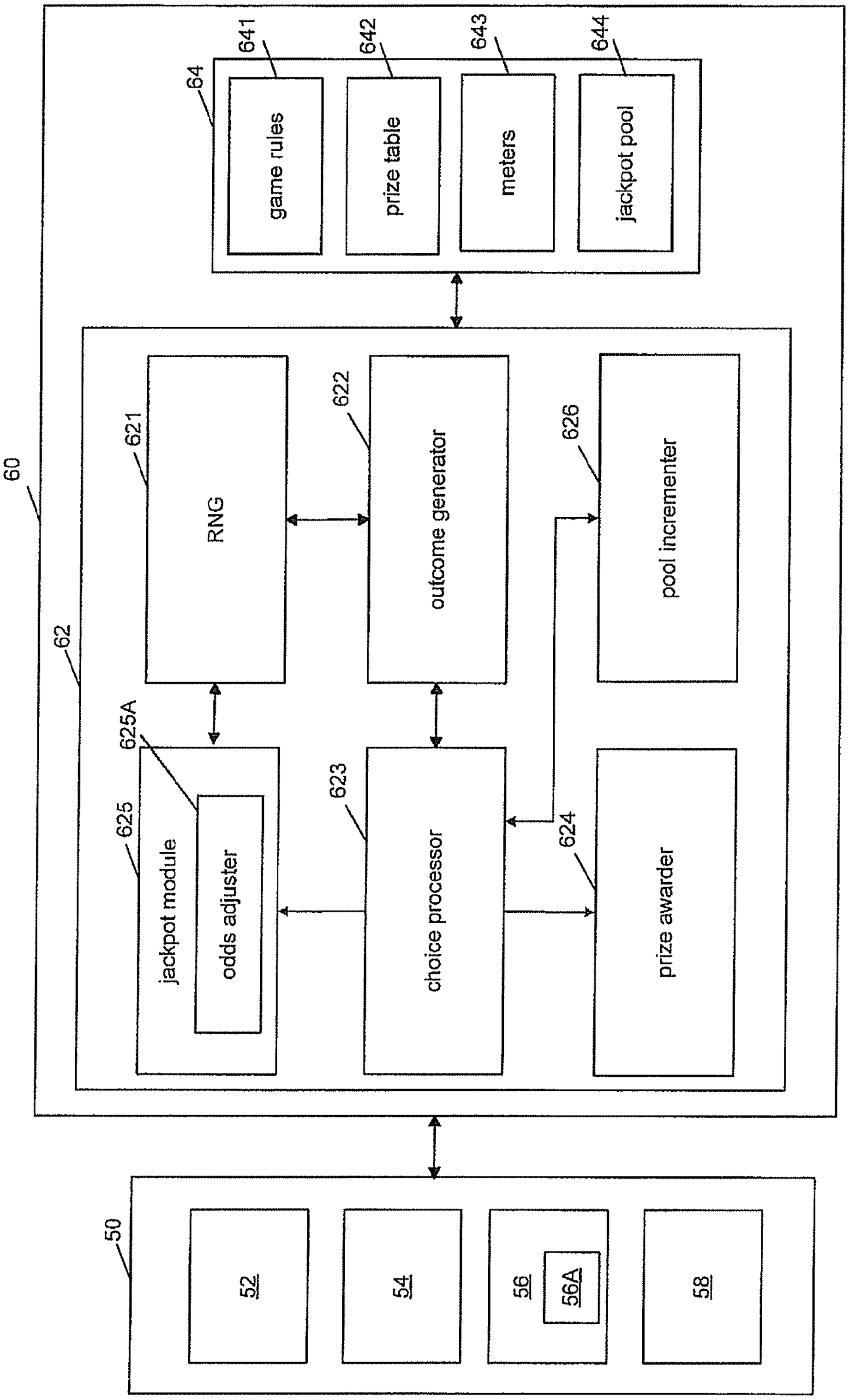
FIG. 6 is a further block diagram of a gaming system.

FIG. 6 shows a gaming system of an embodiment where the compensatory award is provided by adjusting the odds of a player winning a jackpot. To play a game round the player operates the instruction input mechanism 56 to place a wager. The outcome generator 622 generates a game outcome based on game rules 641 using random number generator 621.

The game rules 641 require the player to male a choice between a set of possible actions. The number of different actions can vary depending on the implementation of the game and can be, for example, a selection between different options. The player operates choice selector 56A of instruction input mechanism 56 to input their choice. The choice processor 623 receives the input choice input and determines whether the player has selected to take an optimal action or a sub-optimal action.

The choice processor 623 provides the choice to the prize award module 624. The prize award module 624 determines what prize applies based on the choice and the prize table 642 (as well as the previously determined game outcome if this affects the prize) and updates the meters 643 accordingly.

The choice processor 623 advises the jackpot module 625 whether the player has made an optimal or sub-optimal choice and the amount of any lost return to player resulting from the choice. The action of the jackpot module 625 varies depending on whether a player has made an optimal choice or a suboptimal choice. In this embodiment, each player has a chance to win the jackpot in each game round and accordingly if a player makes an optimal choice, the jackpot module 625 determines whether they have won a prize from the jackpot pool 644 in accordance with the normal odds of winning. Those normal odds of winning may depend, for example, on the size of a player's bet If the choice processor 623 determines that a player made sub optimal choice it determines the amount of credits that the player has foregone by the sub-optimal choice and advises the pool incrementer 626 which adds the amount of credits to the jackpot pool 644. It will be appreciated in this embodiment the jackpot is a progressive jackpot which allows the pool to be incremented.

A person skilled in the art will appreciate that the amount of lost return can be represented in a number of different ways including as an amount in currency. The choice processor 623 also advises the jackpot module 625 that the player is made of sub-optimal choice. The odds adjustor 625A adjust the odds of winning the jackpot in order to compensate the player for the lost amount of credits. The jackpot controller module 625 then determines using random number generator 621 whether the player has won the jackpot. Accordingly, players who make sub-optimal choices have a greater chance of winning the jackpot. Persons skilled in the art will appreciate that the jackpot controller module 625 could be provided by a separate device in data communication with the game controller, for example at jackpot server 207

In an alternative embodiment only players who male sub-optimal choices get access to a chance to win the jackpot in this particular part of the game. Other players may have a chance to win the jackpot in other parts of the game.

It will be appreciated that the determination of whether the player has won the jackpot is made by the jackpot module 625 as part of the game round such that compensation is targeted specifically at players who make the sub-optimal play. Merely increasing the jackpot pool with any loss returned to player could result in players who are more skilled in obtaining a better return to player and less skill.

Figure 7:
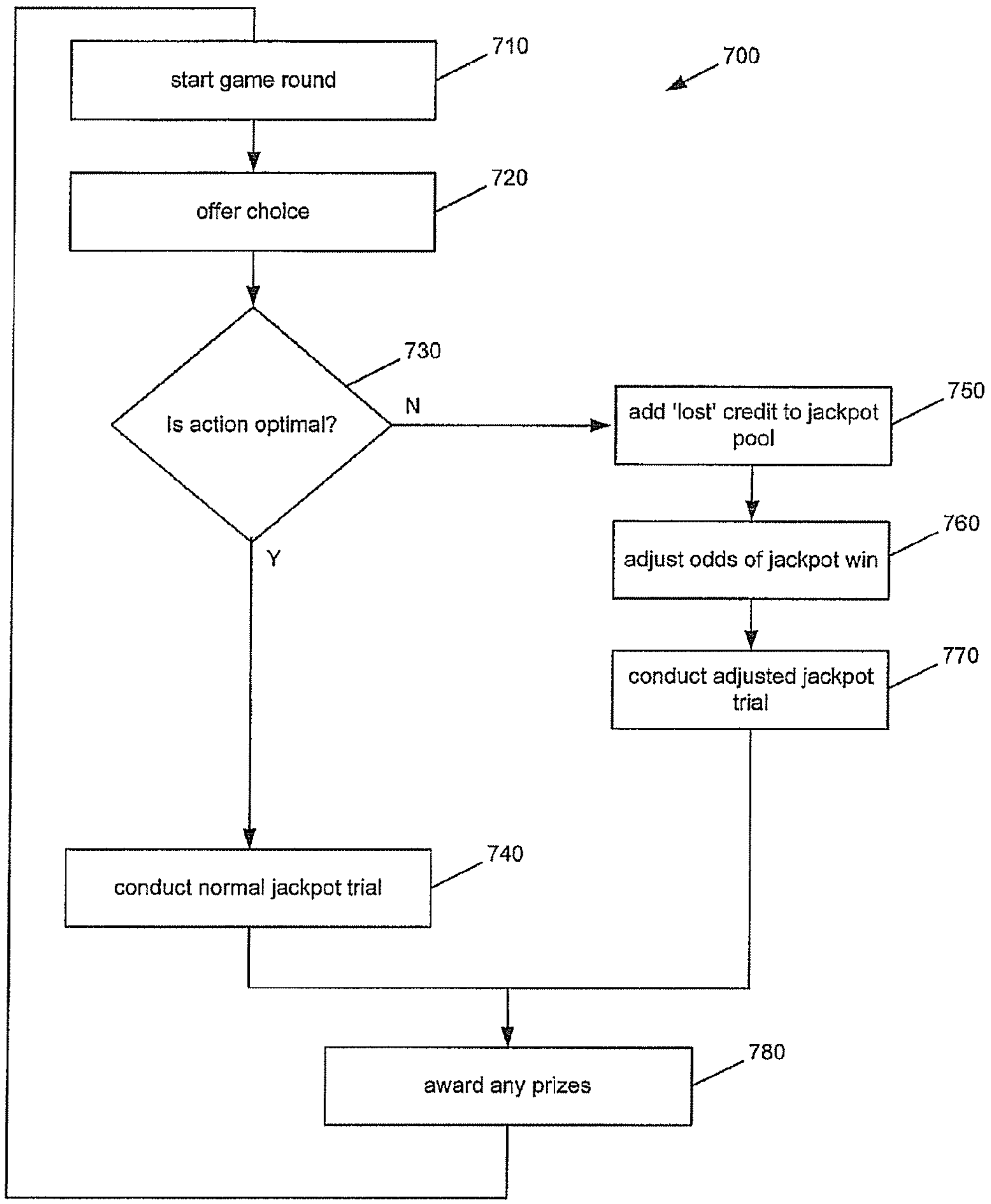
FIG. 7 is a flow chart of an embodiment.

The method is summarized in FIG. 7 and involves starting a game round 710 and offering a player choice of some action 720, for example a decision to make, where they must make a selection. The method then involves determining whether the action is optimal 730 and if it is optimal conducting a normal jackpot trial 740 and awarding any prizes 780. If the action is not optimal the method involves adding the lost credit to the jackpot pool 750, adjusting the odds for jackpot wins 760 and conducting an adjusted jackpot trial 770 and awarding prizes if any before proceeding to the start of another game round. Other features of the method will be apparent from the above description of the gaming system.

Persons skilled in the art will appreciate that the probability of winning is adjusted in accordance with the lost return to player. Thus the expected return to player of the jackpot is compensates for the lost return to the player. Further, it is possible to offer players a game of skill without providing optimal play instructions. Thus, players who derive enjoyment by learning the optimal plays for a game while other players who do not learn the optimal plays are not disadvantaged.

Persons skilled in the art will also appreciate that the method of the embodiment could be embodied in program code. The program code could be supplied in a number of ways, for example on a computer readable medium, such as a disc or a memory (for example, that could replace part of memory 103) or as a data signal (for example, by downloading it by transmitting it from a server).

EXAMPLES

Example 1

A game has a free game multiplier that is randomly generated, either ×2 or ×4 multiplier with even probability. Thus, the average result is ×3. The player has an option of repeating the selection and so the player gets a second chance to hit the ×4 if their original result was ×2. Hence the optimal play would be to repeat the selection if the player receives ×2. If the player refuses to repeat the selection then they have rejected an average multiple at ×3 and taken an average multiplier at ×2. The loss is equivalent to an average multiplier at ×1. This amount in credits (i.e. what the player would win without the multiplier) is forwarded to the jackpot pool and a probability for winning the jackpot could be cast immediately such that the expected return from the jackpot for this hapless player is exactly the return lost through the poor decision.

Example 2

In this example, a fixed value prize is available to be awarded as compensation—a feature is worth a total value of $30 and the feature comprises 30 skill events worth $1 each. Player A only wins $20 in the feature. To maintain player return, the player A needs to be paid $10. In this game, a prize of $40 is available as a randomly awarded prize. The player has lost $10 so the player needs a 1 in 4 chance of winning the $40. Player B plays the same game but has less skill and wins only $10 in the skill feature. The player has "lost" $20. The fixed prize is $40 so the player needs a 1 in 2 chance to win the fixed prize. The game adjusts the probability of winning the prize accordingly.

Example 3

In this example a progressive prize is available to be awarded as compensation. Using the example above, the player has "lost" $10 due to lack of skill but a regulator requires that the player have access to be able to win that amount to ensure fairness. The $10 amount is added to a progressive meter. (The addition can be to the visible meter or the amount can be broken in to parts with some of the amount going to a hidden meter to fund future start ups and some of it going to the visible meter) The visible progressive meter reads $15. Half of the lost amount is added to the visible meter and the other half goes to the hidden meter. The visible meter now reads $20 and the hidden meter has increased by $5. The player needs to be given a chance to win $10. The available prize is $20 on the progressive meter. So the player is given a 1 in 2 chance of winning the progressive meter. The player is successful and the player is paid the $20 and the meter resets to $5 from the hidden meter. Time passes and the visible progressive meter now reads $20. Player B has "lost" $20 of which $10 goes to the visible meter and $10 to the hidden meter. The visible meter now reads $30. Player B is given a 2 in 3 chance of winning the progressive meter.

It will be understood to persons skilled in the art of the invention that many modifications may be made without departing from the spirit and scope of the invention. in particular, various of the above features may be combined to form further embodiments.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of gaming for use with a gaming system having a gaming controller, the method comprising:

conducting a game via the gaming controller requiring a player to make a choice between at least one optimal action and at least one sub-optimal action having a lower return to player than said at least one optimal action such that the difference between the sub-optimal action and the optimal action represents a lost return to player;

receiving via the gaming controller a player choice of one of the actions;

conducting via the gaming controller a trial for an award 1) irrespective of whether the player chooses an optimal or sub-optimal action and 2) in which the probability of success of the trial is determined based on a relationship between the lost return to player and the award, such that an expected return to player from the trial compensates the player for the lost return to player in response to the choice being a sub-optimal action; and adjusting via the gaming controller the probability of winning the award during play of the trial based on whether the player chooses an optimal action or sub-optimal action.

2. A method as claimed in claim 1, and wherein an expected return to player is equivalent to the lost return to player when the choice is a sub-optimal action.

3. A method as claimed in claim 1, and further comprising conducting a normal trial for the award in response to a player choosing an optimal action such that the expected return to player is increased when the choice is a sub-optimal action.

4. A method as claimed in claim 1, and wherein the award is a progressive jackpot.

5. A method as claimed in claim 4, and further comprising adding the lost return to player to a pool of the progressive jackpot.

6. A game controller for a gaming system, the game controller arranged to:

conduct a game requiring a player to make a choice between at least one optimal action and at least one sub-optimal action having a lower return to player than said at least one optimal action such that the difference between the sub-optimal action and the optimal action represents a lost return to player;

receive a player choice of one of the actions;

conduct a trial for an award 1) irrespective of whether the player chooses an optimal or sub-optimal action, and 2) in which the probability of success of the trial is determined based on a relationship between the lost return to player and the award, such that an expected return to player from the trial compensates the player for the lost return to player in response to the choice being a sub-optimal action; and adjust the probability of winning the award during play of the trial based on whether the player chooses an optimal action or sub-optimal action.

7. A game controller as claimed in claim 6, and wherein an expected return to player is equivalent to the lost return to player when the choice is a sub-optimal action.

8. A game controller as claimed in claim 6, and further arranged to conduct a normal trial for the award in response to a player choosing an optimal action such that the expected return to player is increased when the choice is a sub-optimal action.

9. A game controller as claimed in claim 8, and wherein the award is a progressive jackpot and the game controller comprises a jackpot odds adjuster arranged to adjust the probability of winning the jackpot based on the player choice.

10. A game controller as claimed in claim 9, and further arranged to add the lost return to player to a pool of the progressive jackpot.

11. A game controller as claimed in claim 6, and further arranged such that the choice is made as part of a game round and any trial is conducted prior to any further game round.

12. A gaming system comprising:

a player interface comprising a display and an instruction input mechanism; and a game controller arranged to:

conduct a game requiring a player to make a choice between at least one optimal action and at least one sub-optimal action displayed to the player on the display, the sub-optimal action having a lower return to player than said at least one optimal action such that the difference between the sub-optimal action and the optimal action represents a lost return to player, receive a player choice of one of the actions from the input mechanism, conduct a trial for an award a) irrespective of whether the player chooses an optimal or sub-optimal action, and b) in which the probability of success of the trial is determined based on a relationship between the lost return to player and the award, such that an expected return to player from the trial compensates the player for the lost return to player in response to determining that the choice is a sub-optimal action; and adjust the probability of winning the award during play of the trial based on the whether the player chooses an optimal action or sub-optimal action.

13. A gaming system as claimed in claim 12, and wherein an expected return to player is equivalent to the lost return to player when the choice is a sub-optimal action.

14. A gaming system as claimed in claim 12, and wherein the game controller is further arranged to conduct a normal trial for the award in response to a player choosing an optimal action such that the expected return to player is increased when the choice is a sub-optimal action.

15. A gaming system as claimed in claim 14, and wherein the award is a progressive jackpot and the gaming system comprises a jackpot odds adjuster arranged to adjust the probability of winning the jackpot based on the player choice.

16. A gaming system as claimed in claim 15, and wherein the game controller is further arranged to add the lost return to player to a pool of the progressive jackpot.

17. A gaming system as claimed in claim 12, and wherein the game controller is further arranged such that the choice is made as part of a game round and any trial is conducted prior to any further game round.

18. A gaming system as claimed in claim 12, and wherein the game controller is arranged to conduct the trial.

19. A gaming system as claimed in claim 12, and further comprising a jackpot controller in data communication with the game controller and arranged to conduct the trial.

20. A method as claimed in claim 1, and wherein the choice is made as part of a game round and any trial is conducted prior to any further game round.

21. A method as claimed in claim 1, and wherein the probability is determined by dividing the quantum of the lost return to player by the magnitude of the award.

22. A game controller as claimed in claim 6, and wherein the probability is determined by dividing the quantum of the lost return to player by the magnitude of the award.

23. A gaming system as claimed in claim 12, and wherein the probability is determined by dividing the quantum of the lost return to player by the magnitude of the award.

* * * * *